(12) United States Patent
Zhu et al.

(10) Patent No.: US 7,477,325 B2
(45) Date of Patent: Jan. 13, 2009

(54) AUDIO/VIDEO SEPARATOR

(75) Inventors: Daniel Q. Zhu, Churchville, PA (US);
Hulyalkar N. Samir, Newtown, PA (US); Binning Chen, Frazer, PA (US);
Raul A. Casas, Doylestown, PA (US);
Dongsheng Wu, Hainesport, NJ (US)

(73) Assignee: ATI Technologies, Inc., Thornhill Ontario (CA)

( * ) Notice: Subject to any disclaimer, the term of this patent is extended or adjusted under 35 U.S.C. 154(b) by 828 days.

(21) Appl. No.: 10/812,279

(22) Filed: Mar. 29, 2004

(65) Prior Publication Data

US 2005/0212977 A1   Sep. 29, 2005

(51) Int. Cl.
*H04N 5/44* (2006.01)

(52) U.S. Cl. ............... 348/725; 348/729; 348/738; 348/726; 348/554; 348/553; 375/326

(58) Field of Classification Search ........ 348/725, 348/726, 729, 736, 737, 738, 731, 21, 554, 348/553; 375/326, 324, 346; 455/213, 222, 455/278.1, 296
See application file for complete search history.

(56) References Cited

U.S. PATENT DOCUMENTS

| | | | |
|---|---|---|---|
| 6,281,813 B1 | 8/2001 | Vierthaler et al. | |
| 6,369,857 B1 * | 4/2002 | Balaban et al. | 348/555 |
| 6,725,463 B1 * | 4/2004 | Birleson | 725/151 |
| 7,145,610 B2 * | 12/2006 | Kaida | 348/725 |
| 7,239,357 B2 * | 7/2007 | Jaffe | 348/726 |
| 2004/0223086 A1 | 11/2004 | Jaffe | |
| 2005/0157820 A1 * | 7/2005 | Wongwirawat et al. | 375/326 |
| 2006/0055824 A1 * | 3/2006 | Zhu et al. | 348/554 |

FOREIGN PATENT DOCUMENTS

EP   1395048 A1   3/2004

OTHER PUBLICATIONS

European Search Report for European Patent Application No. EP05251940; Jul. 6, 2005; pp. 1-2.
Micronas Application Note IC "DRX 396xA PCB Layout Recommendations" Edition Nov. 7, 2002, 6251-510-2-1AN.
Micronas Short Information DRX 3960A Digital Receiver Front-end; Oct. 2000.
Micronas Data Sheet "MSP 34x0G Multistandard Sound Processor Family" Edition May 27, 2003 6251-476-1DS.
Philips Semiconductors Data Sheet Product specification TDA9855 12C-bus controlled BTSC stereo/SAP decoder and audio processor; Nov. 4, 1997.

* cited by examiner

*Primary Examiner*—David L Ometz
*Assistant Examiner*—Jean W Désir
(74) *Attorney, Agent, or Firm*—McAndrews, Held & Malloy

(57) ABSTRACT

An audio/video separator provides a high-performance and cost-effective solution to analog TV reception with only one A/D converter and a minimum of analog IF components. The apparatus may operate on a digitized TV signal and, when integrated with a digital video processor, process video signals while separating audio signals. The resultant audio and video signals may be considered to have excellent signal quality due to highly optimized demodulation architecture and digital signal processing techniques on both audio and video data paths.

19 Claims, 7 Drawing Sheets

AUDIO/VIDEO SEPARATOR

FIELD OF THE INVENTION

The present invention relates to digital processing of analog television signals and, more particularly, to separating audio and video signals from an analog television signal.

BACKGROUND

Transmitting a basic television signal adhering to the National Television System Committee (NTSC) standard requires sending an audio signal to accompany a video signal by frequency-modulating an audio carrier located 4.5 MHz above a video carrier.

Conventional analog television (TV) receivers employ analog components to separate the audio signal from a received NTSC TV signal before demodulating and decoding the audio signal. Such analog components include surface acoustic wave (SAW) filters, amplifiers, automatic gain control (AGC) circuitry and automatic frequency control (AFC) circuitry.

As is known in TV receiver design, a TV signal is received in the radio frequency (RF) portion of the electromagnetic spectrum and converted to an intermediate frequency (IF) by components collectively referred to as a front end tuner. The video signal and audio signal are then, typically, separated at the output of the front end tuner, that is, while the TV signal is in the IF. Subsequently, each signal (audio, video) is demodulated separately by using separate filters and amplifiers.

It is known to perform the demodulation in the digital domain to take advantage of digital signal processing techniques. However, because such demodulation is signal specific, the TV signal is typically filtered by distinct analog filters to simultaneously yield an audio signal and a separate video signal. The separated audio signal and video signal are then processed by corresponding analog-to-digital converters before separate digital demodulation.

The disadvantages of using analog components to separate the audio signal from the received NTSC TV signal are numerous. The analog approach to TV receiver design may be considered to compromise performance due to a lack of precise analog signal filter, analog detector and analog control circuit design. In particular, poor separation of the audio signal and the video signal may cause mutual interference between demodulated audio and video signals. Furthermore, reducing power consumption of the TV receiver may be difficult.

Clearly, an improved design is required for a receiver of an analog television signal, where the improved design provides more precise separation of the audio signal and the video signal from the received TV signal.

SUMMARY

An audio/video separator is implemented to separate a digitized audio signal and a digitized video signal from a digitized version of an analog television signal. Working in the digital domain, the audio/video separator provides higher-performance and lower cost than that of analog separation solutions. Due to the precision of a digital filter employed to perform the separation of the audio and video signals from the digitized television signal, the input to the filter should be as close to baseband as possible. To this end, a video carrier recovery circuit may be employed to determine, and act to reduce, any frequency offset present in the digitized television signal. Once the frequency offset has been reduced, a selection circuit may be employed to reverse the order of video carrier recovery and filtering. Such a reversal of order may be seen to improve the output digitized audio signal and output digitized video signal, as a steady-state phase error introduced by the video carrier recovery circuit is then absent from the output audio signal.

Optionally, the audio/video separator may be integrated with a digital video processor. Since such an integrated digital processor and audio/video separator operates with digital signal processing techniques, many analog components associated with an analog approach to the same tasks may be eliminated, such as SAW filters, amplifiers, AGCs and AFCs. In addition, the integrated digital processor and audio/video separator may be seen to offer superior video and audio performance due to optimized digital filter design and signal processing algorithms. Finally, the integrated digital processor and audio/video separator may be seen to consume less power than conventional analog receivers, in part due to implementation as a Very Large Scale Integrated (VLSI) Circuit.

In accordance with an aspect of the present invention there is provided an apparatus for processing a near-baseband, received digitized television signal. The apparatus includes a video carrier recovery circuit, a filter circuit and a selection circuit. The video carrier recovery circuit is adapted to receive a video carrier recovery circuit input signal, the video carrier recovery circuit input signal including a video carrier signal, detect a phase offset of the video carrier signal, generate a phase adjustment signal based on the phase offset and produce a video carrier recovery circuit output signal from the video carrier recovery circuit input signal and the phase adjustment signal. The filter circuit is adapted to receive a filter circuit input signal, the filter circuit input signal including components in a frequency range that is expected to contain a digitized audio signal and produce a filter circuit output signal excluding the components in the frequency range. The selection circuit is adapted to switch between a first configuration, wherein the near-baseband, received digitized television signal is the video carrier recovery circuit input signal and the video carrier recovery circuit output signal is the filter circuit input signal, and a second configuration, wherein the near-baseband, received digitized television signal is the filter circuit input signal and the filter circuit output signal is the video carrier recovery circuit input signal.

In accordance with another aspect of the present invention there is provided a method of processing an analog television signal. The method includes converting the analog television signal to a digitized television signal having a frequency offset relative to baseband, reducing the frequency offset to produce a near-baseband digitized television signal having a residual frequency offset, producing a signal representative of the residual frequency offset, based on the signal representative of the residual frequency offset, reducing the frequency offset to produce a nearer-to-baseband digitized television signal and filtering the nearer-to-baseband digitized television signal to produce a first filter output signal having components restricted to a first frequency range, where the first frequency range is expected to contain an audio signal.

In accordance with a further aspect of the present invention there is provided a television signal reception system. The system includes a tuner adapted to shift an analog television signal associated with a radio frequency carrier to an analog television signal at an intermediate frequency, an analog to digital converter adapted to produce a digitized television signal having a frequency offset relative to baseband, where the digitized television signal is based on the analog television signal at the intermediate frequency, and a carrier separator. The carrier separator includes a video carrier recovery circuit adapted to detect the frequency offset and produce an indication of the frequency offset, a mixer, responsive to receipt of the indication of the frequency offset, adapted to reduce the frequency offset to produce a near-baseband digitized television signal, and a filter adapted to filter the near-baseband digitized television signal to produce a digitized sound signal.

In accordance with a still further aspect of the present invention there is provided an apparatus for processing a near-baseband, received digitized television signal. The apparatus includes a video carrier recovery circuit, a filter circuit and at least two selection switches. The video carrier recovery circuit includes a video carrier recovery circuit input port to receive a video carrier recovery circuit input signal, the video carrier recovery circuit input signal including a video carrier signal, a phase error detector to detect a phase offset of the video carrier signal, a loop filter to generate a phase adjustment signal based on said phase offset and a video carrier recovery circuit output port to produce a video carrier recovery circuit output signal from the video carrier recovery circuit input signal and the phase adjustment signal. The filter circuit includes a filter circuit input port to receive a filter circuit input signal, the filter circuit input signal including a frequency range that is expected to contain a digitized audio signal, a filter to produce a filter circuit output signal by excluding the components in the frequency range and a filter circuit output port to transmit said filter circuit output signal. A first selection switch is adapted to receive first received signals including the near-baseband, digitized television signal and the filter circuit output signal and pass one of the first received signals to the video carrier recovery circuit input port. A second selection switch is adapted to receive second received signals including the near-baseband, digitized television signal and the video carrier recovery circuit output signal and pass one of the second received signals to the filter circuit input port.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
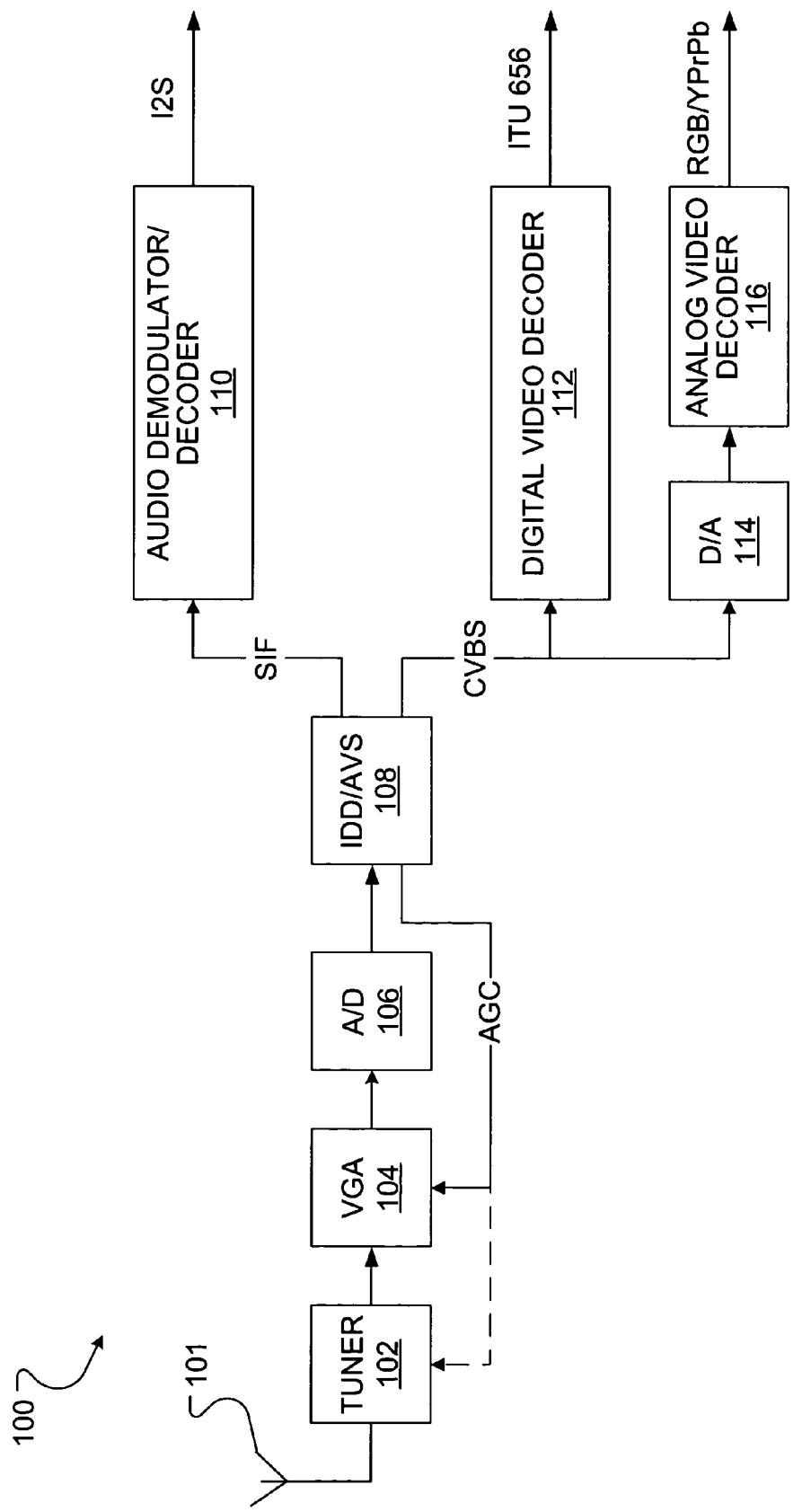
FIG. 1 illustrates a TV signal reception system including an integrated digital demodulator and audio/video separator according to an embodiment of the present invention.

FIG. 1 illustrates a TV signal reception system 100 for use, for example, in a TV set or set-top box application. A standard TV antenna 101 connects to a tuner 102. The output of the tuner is received by a Variable Gain Amplifier (VGA) 104 whose gain is selected based on a received gain control signal whose origin will be discussed hereinafter. The TV signal at the output of the VGA 104 is then received by an analog-to-digital (A/D) converter 106.

The A/D converter 106 has been implemented as the well-known sample-and-hold type but, as will be appreciated by a person skilled in the art, other types of A/D converters may be used here equally. Given that a common input IF TV signal with 6 MHz bandwidth from the tuner 102 is centered at around 44.25 MHz, the A/D converter 106 may operate in a bandpass sampling mode with typical sampling frequency around 25 MHz. The bandpass sampling effect of the A/D converter 106 is to frequency shift the TV signal down to 6.25 MHz while digitizing the entire 6 MHz band of the desired TV channel.

An integrated digital demodulator and audio/video separator (IDD/AVS) 108, whose structure will be described in detail hereinafter, receives the output of the A/D converter 106 and produces three outputs: a digital sound signal, which may also be referred to as a digital "sound IF" (SIF); a digital Composite Video Baseband Signal (CVBS); and a gain control signal. The digital SIF is received by an audio demodulator/decoder 110. The digital CVBS is received by a digital video decoder 112 and a digital-to-analog (D/A) converter 114. The gain control signal is received by the VGA 104. The output of the D/A converter 114 is received by an analog video decoder 116.

Figure 2:
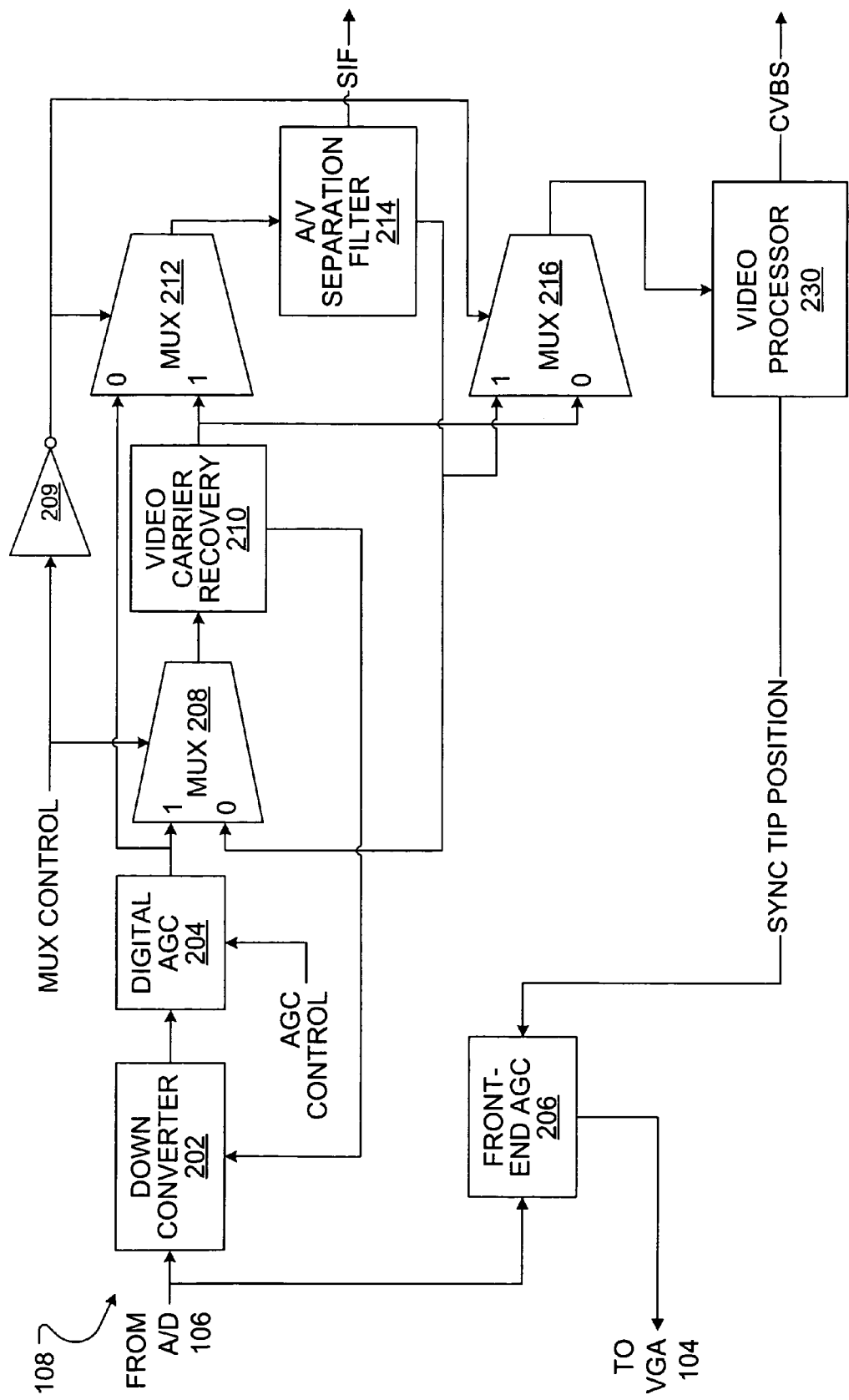
FIG. 2 illustrates, as a detailed block diagram, the integrated digital demodulator and audio/video separator from the system of FIG. 1 according to an embodiment of the present invention.

FIG. 2 is a detailed block diagram of the IDD/AVS 108. A baseband down-converter 202, which may take the form of a controllable mixer, receives the input signal to the IDD/AVS 108. The output signal from the down-converter 202 is received by a digital automatic gain control (AGC) unit 204.

The digital AGC unit 204 communicatively connects to a video carrier recovery circuit 210 via a first multiplexer 208 and to an audio/video separation filter 214 via a second multiplexer 212.

Figure 3:
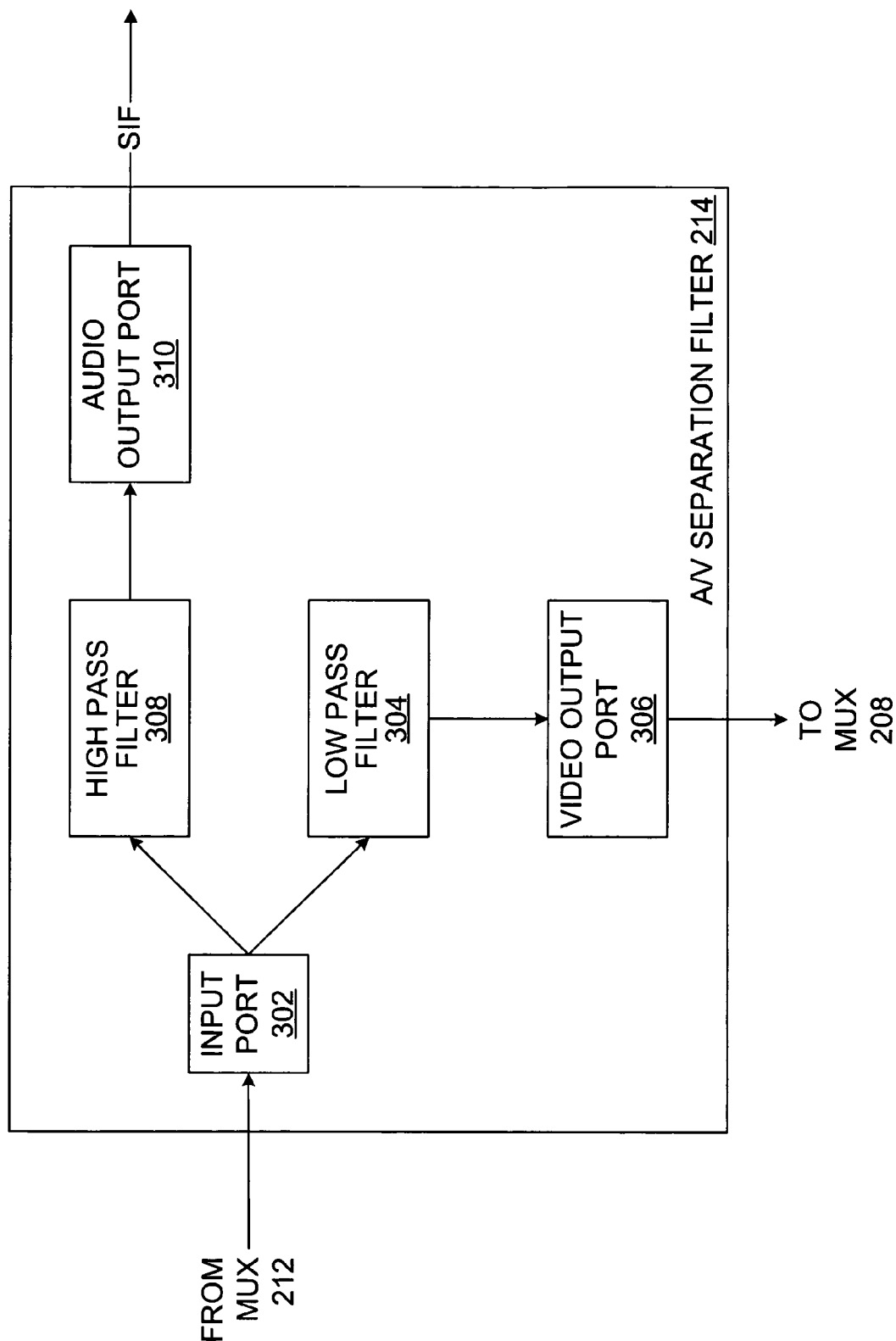
FIG. 3 illustrates an audio/video separation filter for use in the integrated digital demodulator and audio/video separator from the system of FIG. 1 according to an embodiment of the present invention.

An optimized, complementary, finite impulse response (FIR) digital filter may be used for the A/V separation filter 214. As illustrated in FIG. 3, the input to the A/V separation filter 214 is received at a filter input port 302 and split into two signal paths. The input signal on a first signal path is subjected to a low pass filter 304 with a cut-off frequency configured such that the low pass filter passes the video signal components of the input signal to a video output port 306. The input signal on a second signal path is subjected to a high pass filter 308 that is complementary to the low pass filter 304 (i.e., the low pass cut-off frequency of the low pass filter and the high pass filter are identical) and has a cut-off frequency configured to pass the audio signal components of the input signal to an audio output port 310.

As mentioned hereinbefore, an audio signal accompanying a video signal in a television signal may be sent, according to the NTSC broadcasting standard, by frequency-modulating an audio carrier located 4.5 MHz above a video carrier. More particularly, when the television signal is shifted to baseband, the video signal will occupy frequencies from 0 to 4.2 MHz and the audio signal will be centered around a 4.5 MHz center frequency and occupy around 120 KHz on each side of the 4.5 MHz center frequency. The applicant has successfully used a cut-off frequency of around 4.25 MHz in the two filters 304, 308 of the A/V separation filter 214. As will be clear, the cut-off frequency is a programmable design characteristic of the two filters 304, 308 and, for the exemplary case of an NTSC television signal, success may be realized using a cut-off frequency in the range from 4.2 to 4.35 MHz.

In designing the two filters of the A/V separation filter 214 (FIG. 2), a minimum requirement of −60 dB was set for the stop band attenuation. Additionally, the passband ripple should be lower than 0.5 dB. To meet these requirements, many possible designs were available. The chosen FIR filter uses a least-squares error minimization method and has a 192-tap filter length.

The video carrier recovery circuit 210 and the A/V separation filter 214 connect to a video processor 230 through a third multiplexer 216. The multiplexers 208, 212, 216 may be toggled between two states by a multiplex control (MUX CONTROL) signal. As they may be toggled between two states, the multiplexers 208, 212, 216 may be considered selection switches. Furthermore, the A/V separation filter 214 is connected to the video carrier recovery circuit 210 via the first multiplexer 208. The video carrier recovery circuit 210 is connected to the down-converter 202 for the transmission of a frequency control signal.

As is known, a sync tip is the peak of the horizontal synchronization pulse. In the video signal, only the sync tip parts (roughly 11 micro second long for each horizontal line) are deterministic, while the visible parts (roughly 53 micro seconds) are random. To perform any kind of AGC (including that controlled by the front-end AGC unit 206), it is necessary to depend on the deterministic part of the video signal, that is, the sync tip part.

The front-end AGC unit 206 receives the same input signal as the down-converter 202 in addition to the information on sync tip position received from the video processor 230 and sends the gain control signal to the VGA 104 (FIG. 1).

Figure 4:
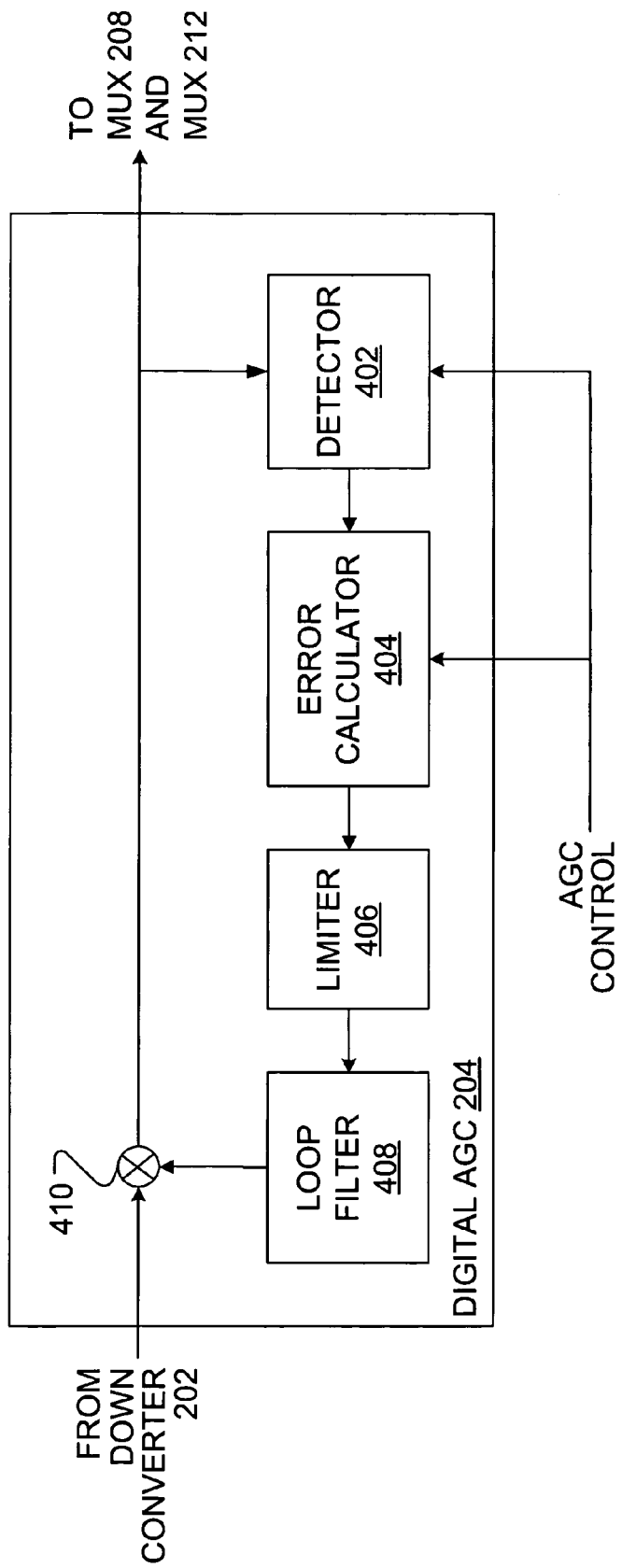
FIG. 4 illustrates a digital automatic gain controller for use in the integrated digital demodulator and audio/video separator from the system of FIG. 1 according to an embodiment of the present invention.

FIG. 4 illustrates an exemplary structure for the digital AGC unit 204. A signal being output from the digital AGC unit 204 is assessed by a detector 402. An indication of the value of a detected metric may then be passed to an error calculator 404. An error signal may be passed from the error calculator 404 to a limiter 406. A limited error signal may then be passed to a loop filter 408. The signal incoming to the digital AGC unit 204 may then be multiplied by the filtered error signal at a multiplier 410.

Figure 5:
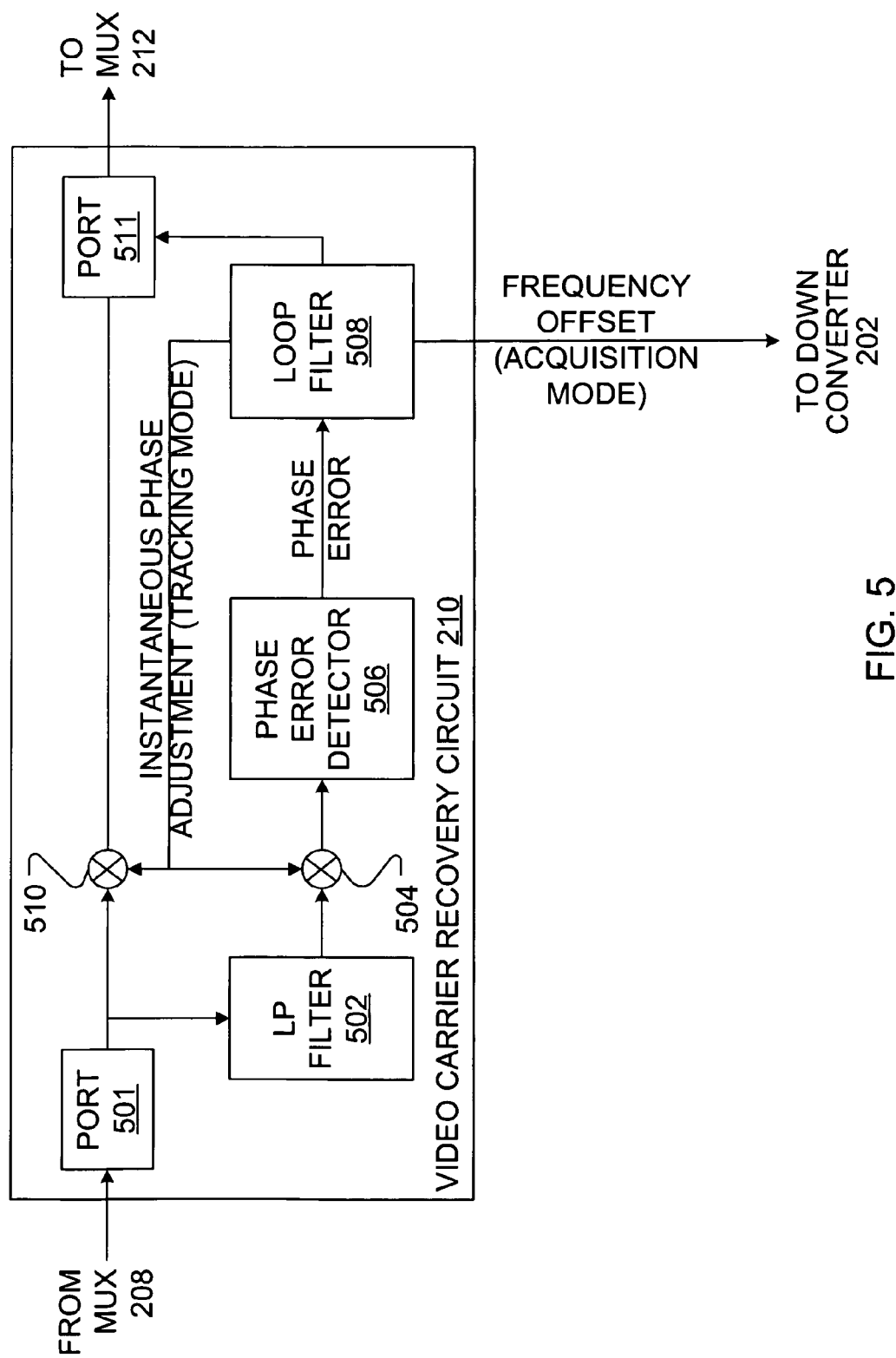
FIG. 5 illustrates a video carrier recovery circuit for use in the integrated digital demodulator and audio/video separator from the system of FIG. 1 according to an embodiment of the present invention.

An exemplary structure for the video carrier recovery circuit 210 is illustrated in FIG. 5. A signal incoming to an input port 501 of the video carrier recovery circuit 210 is split into two paths. In the first (lower) path, the signal is received by a low pass filter 502. The output of the low pass filter 502, which may, for instance, pass frequencies from 0 to 500 KHz, is passed to a phase error detector 506 via a first multiplier (or mixer) 504. A phase error output from the phase error detector 506 is then received by a loop filter 508. The loop filter 508 produces a frequency offset for sending to the down-converter 202 (for gross frequency offset control) and an instantaneous phase adjustment signal for sending to the first multiplier 504 (for phase error control, which may be considered, over time, to be analogous to fine frequency offset control). In the second (upper) path, the signal received by the input port 501 is passed to a second multiplier (or mixer) 510, which also receives the instantaneous phase adjustment signal. The output of the second multiplier 510 is passed to an output port 511 as the output of the video carrier recovery circuit 210. The operation of the video carrier recovery circuit 210 may be considered analogous to the operation of a conventional phase locked loop, including the phase error detector 506, the loop filter 508 and a phase-controllable signal source, wherein the combination of the input port 501, the low pass filter 502, the first multiplier 504 and the second multiplier 510 may be considered the phase-controllable signal source.

Figure 7:
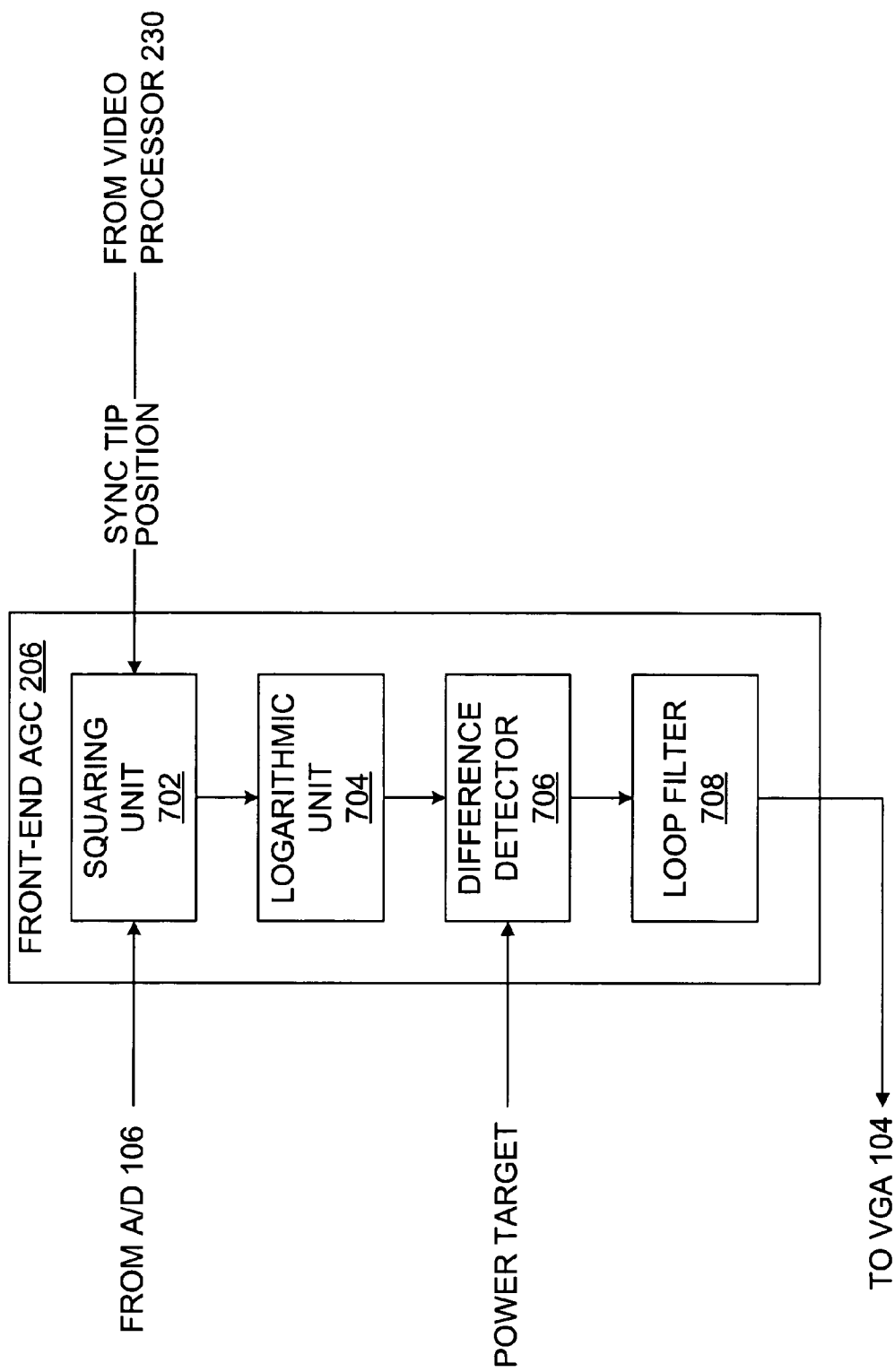
FIG. 7 illustrates an exemplary design for a front-end automatic gain control unit from the integrated digital demodulator and audio/video separator of FIG. 2.

A sync tip position determined by the video processor 230 is received by the front-end AGC unit 206, whose components are illustrated in FIG. 7. In particular, the sync tip position is received by a squaring unit 702, which also receives a digitized TV signal from the digitized A/D converter 106. The output of the squaring unit is received by a logarithmic unit 704 whose corresponding output is received by a difference detector 706. A power target is also received by the difference detector 706 such that a difference between the output of the logarithmic unit 704 may be compared to the power target and the difference forwarded to a loop filter 708. The output of the loop filter 708 is the gain control signal used to control the VGA 104 (FIG. 1).

In overview, rather than separate the audio signal and the video signal from an IF TV signal using analog components, the analog IF TV signal is digitized and the digitized TV signal is processed using digital components. As a result, more accurate audio and video signals are available at the output and cost savings may be realized.

In operation, the antenna 101 receives a broad spectrum of electromagnetic radiation and passes an electrical signal representative of that radiation to the tuner 102. The tuner 102 tunes to a specific frequency range, i.e., a TV channel, in the RF part of the electromagnetic radiation spectrum. The result of such tuning is a frequency shift of the RF TV signal to an IF TV signal. The IF TV signal is then filtered and amplified by the VGA 104.

In particular, the VGA 104 may either boost or attenuate the received IF TV signal such that the input (peak) power to the A/D converter 106 is maintained at a desirable level for sampling, regardless of the signal power received at the antenna. An IF strip (not shown), as part of the VGA 104, may include anti-aliasing filters, which are useful for preparing the IF TV signal for sampling and for attenuating interfering adjacent signals. The VGA 104 may be controlled in a closed-loop fashion by the front-end AGC unit 206 (FIG. 2) in a manner that will be described hereinafter.

The filtered and amplified IF TV signal is then digitized by the A/D converter 106 to result in a digitized TV signal. The digitized TV signal output from the A/D converter 106 is received by the IDD/AVS 108, which, as mentioned hereinbefore, produces a digital CVBS, a digital SIF and a GC signal.

The digital CVBS may be processed by the digital video decoder 112 to produce desirable digital video output, for instance, digital video over an interface adhering to the International Telecommunication Union (ITU) standard ITU-R BT.686. Alternatively, the digital CVBS may be converted to an analog CVBS by the digital-to-analog (D/A) converter 114 and the analog CVBS processed by the analog video decoder 116 to produce desirable analog video output, for instance, in the known RGB format or the known YPrPb format.

The digital SIF may be processed by the audio demodulator/decoder 110 to produce desirable digital audio output, for instance, digital audio over an I2S interface. As will be familiar to the person skilled in the art, I2S is a digital audio interface used inside equipment to transfer audio between integrated circuits.

Operation of the IDD/AVS 108 may be better understood in view of FIG. 2. The down-converter 202 mixes the received digitized TV signal such that the frequency offset of the video carrier is reduced from 6.25 MHz down to near baseband (0 MHz, i.e., direct current or "DC") with a fixed conversion ratio. The down-converter 202 is further adapted to reduce a remaining frequency offset, an indication of which may be received from the video carrier recovery circuit 210. The down-converter 202 may include a sharp, brick-wall, linear-phase low pass filter (not shown) to attenuate interfering signals outside the frequency band of interest, thereby removing adjacent channel and image interference. More specifically, application of the brick-wall filter may be delayed until it has been determined, and indicated to the down-converter 202 by the loop filter 508 of the video carrier recovery circuit 210, that the frequency offset of the digitized TV signal has been significantly reduced.

Once the frequency offset of the video carrier that characterizes the digitized TV signal has been significantly reduced, it may be considered that the low pass filter of the down-converter 202 sufficiently filters out adjacent channel interference. Accordingly, after the down-converter 202, only the desired signal remains. The level of the desired signal can be very small. Ideally, in a fixed-point implementation, the desired signal should occupy the top bits, i.e., the desired signal should be represented by the full range of bits available. Such a full range representation is known to reduce quantization error in subsequent processing. The digital AGC unit 204 acts to boost the level of the desired signal after the down-converter 202.

Thus the digital AGC unit 204 may be used to counter some of the effects of adjacent channel interference. Assuming a desired channel is channel 6, it may be that the signal at channels 5 and 7 are very strong. Adjacent channel interference signals from channels 5 and 7 may be received at the A/D converter 106. If the adjacent channel interference is sufficiently stronger than the desired signal (channel 6), then the majority of the A/D range may be occupied by the interference. Consequently, the desired signal may only occupy a small part of the A/D range.

A signal being output from the digital AGC unit 204 is assessed by the detector 402 (FIG. 4). According to the received AGC control signal, the detector 402 may detect the value of a metric of the signal being output from the digital AGC unit 204, where the metric may be, for instance, peak amplitude or average power. An indication of the value of the detected metric may then be passed to the error calculator 404. In addition to indicating which metric to detect (e.g., peak amplitude, average power, etc.), the AGC control signal may also indicate a target value for that metric to the error calculator 404. The error calculator 404 may perform a comparison of the detected value of the metric with the target value of the metric to produce an error signal. The error signal may then be passed to the limiter 406, which acts to generate a limited error signal in which small errors are zeroed out. The limited error signal is then passed to the loop filter 408. The loop filter 408 filters the limited error signal to produce a filtered error signal. The loop filter 408 may be provisioned with a very small bandwidth to avoid introducing noise. The signal incoming to the digital AGC unit 204 is then multiplied by the filtered error signal at the multiplier 410, i.e., the signal incoming to the digital AGC unit 204 is amplified by the multiplier 410 with a gain based on the filtered error signal.

The video carrier recovery circuit 210 may operate primarily in two modes. In an initial (acquisition) mode, the video carrier recovery circuit 210 determines an initial amount of frequency offset (from baseband) in the near-baseband digitized TV signal received from the digital AGC unit 204 by detecting a video carrier signal within the demodulated channel. Notably, where the down-converter 202 provides an initial frequency shift of the order of 6.25 megahertz, the video carrier recovery circuit 210 may instruct, in the acquisition mode, the down-converter 202 to perform a further frequency shift of the order of hundreds of kilohertz. The output of the video carrier recovery circuit 210 in the acquisition mode is a feedback signal indicating the initial amount of frequency offset to the down-converter 202, so that the initial amount of frequency offset may be removed from the digitized TV signal.

In a subsequent (tracking) mode, the video carrier recovery circuit 210 may track a residual (usually small) frequency offset to ensure that the spectrum of the output digital TV signal is precisely positioned in DC prior to a video/audio signal separation operation and/or subsequent video demodulation. When the spectrum of the output digital TV signal is properly positioned, the video carrier may be perceived only as a DC level, rather than a sinusoid having a frequency. Residual frequency offset, if any, is often primarily due to phase noise at the tuner 102. The output of the video carrier recovery circuit 210 in the tracking mode is the digitized TV signal with both the initial amount of frequency offset removed and the residual amount of frequency offset significantly reduced. To reduce the residual amount of frequency offset, the video carrier recovery circuit 210 acts to adjust the phase of the output signal in accordance with a difference between the phase of the video carrier and a reference phase. It is known that the output of a phase locked loop, to which, as discussed hereinbefore, the video carrier recovery circuit 210 may be considered analogous, will always have some phase jitter. As should be clear to a person skilled in the art, the extent of the phase jitter in the output digital TV signal from the video carrier recovery circuit 210 is directly related to the amount of bandwidth for which the loop filter 508 (see FIG. 5) is configured.

More detailed operation of the video carrier recovery circuit 210 may be considered in view of the exemplary structure illustrated in FIG. 5. In the first path, the low pass filter 502 removes high frequency components of the signal received by the video carrier recovery circuit 210. The output of the low pass filter 502 is passed to the phase error detector 506 via the first multiplier 504. If the digitized TV signal is properly positioned at DC, the output of the low pass filter is only real valued. The phase error detector 506 compares the phase of the output of the first multiplier 504 to a reference phase (i.e., zero) to generate a detected phase error. If the digitized TV signal is not properly positioned at DC, the output of the low pass filter is complex valued, and therefore has a non-zero phase. A signal representative of the detected phase error is passed by the phase error detector 506 to the loop filter 508. The loop filter 508 processes the signal representative of the detected phase error and, along with smoothing any sudden changes in the signal representative of the detected phase error, determines a magnitude of a phase adjustment, $\theta$, to counteract the phase error.

Such phase error control, during which a phase error of small magnitude is corrected by sending an instantaneous phase adjustment signal, $e^{j\theta}$, to the first multiplier 504 and the second multiplier 510, may be seen, over time, to constitute fine frequency error control.

For gross frequency error control, an ongoing phase error of large magnitude (representative of a large frequency offset) is corrected by sending a frequency offset signal, determined as the rate of change of the phase adjustment, θ, to the down-converter 202 as a value representative of the large frequency offset.

The output digital TV signal of the video carrier recovery circuit 210 in the tracking mode is the output of the second multiplier 510.

While the acquisition mode may be seen to be concerned with the reduction of large scale frequency offset (hundreds of KHz) at the down-converter 202, the tracking mode may be seen to be concerned with the reduction of phase error within the video carrier recovery circuit 210, which has the consequence of reducing small scale frequency error. The loop filter 508 may determine that it is time to switch from the acquisition mode to the tracking mode, wherein the instantaneous phase adjustment signal is sent to the first multiplier 504 and the second multiplier 510, when the magnitude of the frequency offset being sent by the loop filter 508 to the down-converter 202 is smaller than a pre-defined threshold. Alternatively, the loop filter 508 may switch from the acquisition mode to the tracking mode after a pre-defined time of operation, say, 10 ms after power up.

Through a connection between the loop filter 508 and the output port 511, the loop filter 508 may control whether a digitized TV signal is (tracking mode) or is not (acquisition mode) output from the video carrier recovery circuit 210.

The acquisition mode, wherein frequency offset detection by the video carrier recovery circuit 210 and compensation by the down-converter 202 is required, may be returned to periodically for situations wherein the digitized TV signal frequency drifts, for example, due to poor performance of the tuner 102.

A frequency-offset reduced digitized TV signal may then be passed from the video carrier recovery circuit 210 to the A/V separation filter 214. Advantageously, the A/V separation filter 214, whose structure has been discussed hereinbefore, may be configured to provide appropriate audio/video separation in addition to a linear phase transfer characteristic so that subsequent Vestigial Sideband filtering (at the video processor 230) and audio demodulation (at the audio demodulator/decoder 110 of FIG. 1) can be carried out on the resultant digitized video output signal and digitized audio output signal (digital SIF signal), respectively, without mutual interference.

Figure 6A:
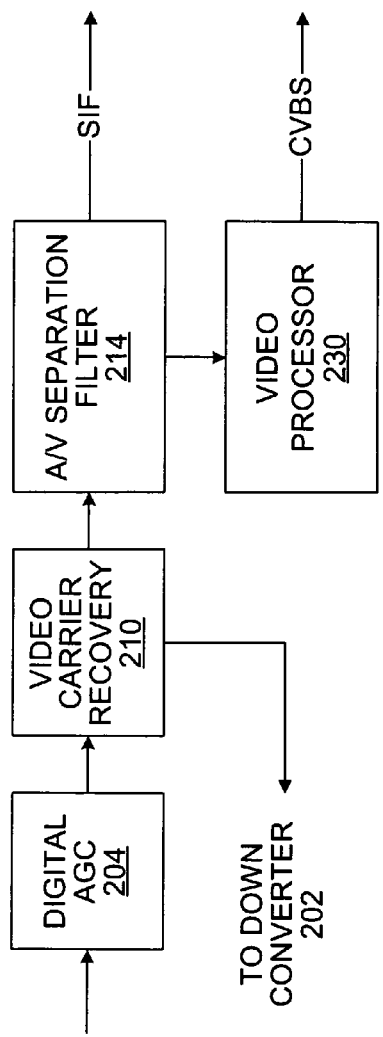
FIG. 6A illustrates a portion of the block diagram of FIG. 2 in a first configuration.
Figure 6B:
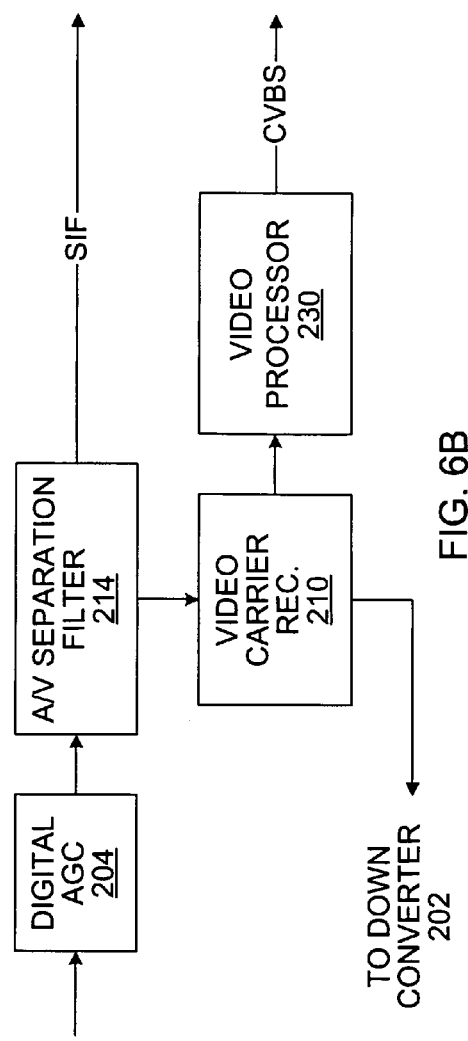
FIG. 6B illustrates a portion of the block diagram of FIG. 2 in a second configuration.

As discussed hereinbefore, the IDD/AVS 108 can be re-configured through a multiplex control (MUX CONTROL) signal to reverse the signal processing order of the video carrier recovery circuit 210 and the A/V separation filter 214. Advantageously, a processing order in which the A/V separation filter 214 precedes the video carrier recovery circuit 210 (FIG. 6B) minimizes interference on the audio signal that is introduced due to the phase jitter present on the output of the video carrier recovery circuit 210 in tracking mode. Any residual frequency offset on the audio signal becomes a DC component after the FM demodulation and may be removed by notch filters after audio decoding. Conversely, a processing order in which the video carrier recovery circuit 210 precedes the A/V separation filter 214 (FIG. 6A) avoids a situation in which an attempt is made to demodulate the audio signal before the majority of the frequency offset is removed. Such an attempted audio signal demodulation may lead to very noisy audio while the video carrier recovery circuit 210 is in the acquisition mode. As it is advantageous not to output a digitized TV signal in the acquisition mode, the configuration of FIG. 6A may more accurately be illustrated without a connection between the video carrier recovery circuit 210 and the A/V separation filter 214.

According to a first MUX CONTROL signal, the output of the first multiplexer 208 is the signal received at the input labeled 1. Furthermore, the output of the second multiplexer 212 is the signal received at the input labeled 1 and the output of the third multiplexer 216 is the signal received at the input labeled 1. In this first configuration, illustrated without the multiplexers 208, 212, 216 in FIG. 6A, the output of the digital AGC unit 204 is received by the video carrier recovery circuit 210, whose output is passed to the A/V separation filter 214. The video output of the A/V separation filter 214 is then passed to the video processor 230.

According to a second MUX CONTROL signal, the output of the first multiplexer 208 is the signal received at the input labeled 0. Furthermore, the output of the second multiplexer 212 is the signal received at the input labeled 0 and the output of the third multiplexer 216 is the signal received at the input labeled 0. In this second configuration, illustrated without the multiplexers 208, 212, 216 in FIG. 6B, the output of the digital AGC unit 204 is received by the A/V separation filter 214, whose video output is passed to the video carrier recovery circuit 210. The output of the video carrier recovery circuit 210 is then passed to the video processor 230.

While the video carrier recovery circuit 210 is in the tracking mode, the second configuration may be used so that the phase jitter in the video carrier recovery circuit 210 does not degrade the audio output signal from the A/V separation filter 214. Where the video carrier recovery circuit 210 employs a high-bandwidth loop filter, phase jitter may be introduced into the both the video and audio output signals. Such phase jitter, while tolerable in the video output signal, could be detrimental to the subsequent demodulation and decoding of the digitized audio output signal. That is, for demodulation of the digitized audio signal, a slight frequency offset is preferred to phase jitter. Such that the second configuration is used while the video carrier recovery circuit 210 is in the tracking mode, the MUX CONTROL signal may be generated by the loop filter 508 responsive to the switch between the acquisition mode and the tracking mode. The MUX CONTROL signal, generated in this way, would select a configuration corresponding to the mode of the video carrier recovery circuit 210.

At the video processor 230, the output of the third multiplexer 216, i.e., a digitized video signal, is received and processed to produce a digital CVBS and a sync tip position using methods beyond the scope of the present application. The video processor 230 provides the sync tip position to the front-end AGC unit 206.

The squaring unit 702 of the front-end AGC unit 206 (FIG. 7) receives the digitized TV signal that is also input to the down-converter 202 and an indication of sync tip position from the video processor 230. The squaring unit 702 is, in particular, concerned with the sync tip portion of the digitized TV signal, which is known to have the highest level in the TV signal. As discussed hereinbefore, the sync tip portion of the digitized TV signal is the only deterministic signal in the whole digitized TV signal. While using the sync tip position to perfect timing, the squaring unit 702 multiplies signal level of the input signal at the sync tip position by itself. A squared sync tip signal level is then received by the logarithmic unit 704. A base-2 logarithm of the squared sync tip signal level is then produced by the logarithmic unit 704 and passed to the difference detector 706.

Effectively, the combination of the squaring unit 702 and the logarithmic unit 704 produce a determined value proportional to the power in the digitized TV signal. Such a proportional value may be compared, in the difference detector 706, to a target value for the power. If the determined value is greater than the target value, the difference detector 706 produces a gain control signal that will reduce the gain in the VGA 104. If the determined value is less than the target value, the difference detector 706 produces a gain control signal that will increase the gain in the VGA 104. The gain control signal is sent to the VGA 104 via the loop filter 708, which acts to smooth any sudden changes in the gain control signal.

Notably, rather than measuring power in the digitized TV signal, the front-end AGC unit 206 may be configured to measure a different target metric. The target metric may be, for example, peak voltage. Broadly stated, the front-end AGC unit 206 produces gain control signals that are sent to the IF VGA 104 (FIG. 1) to maintain a target metric at a desired level. The desired level is selected so that the analog IF TV signal at the output of the VGA 104 is received optimally by the A/D converter 106, i.e., to avoid clipping (of signal that is too strong) or a signal that is too weak.

Alternatively or additionally, the front-end AGC unit 206 may send control signals to an amplifier within the tuner 102 (FIG. 1) to facilitate delayed-AGC application.

In contrast to existing digital video demodulation solutions that separate the analog and video signals from an analog IF TV signal and then digitize the analog audio signal and the analog video signal separately, only one A/D converter (A/D converter 106) may be employed in the receiver design proposed herein for digitizing an entire TV signal. The separation of the audio signal from the video signal may then take place in the digital domain, which allows more accurate separation than available in the analog domain.

The multi-mode video carrier recovery (acquisition, tracking) at the video carrier recovery circuit 210 coupled with the complementary design of the A/V separation filter 214 may be seen to improve audio/video separation and digital CVBS construction. As a result, the demodulated digital CVBS has SIF rejection qualities and video performance (i.e., signal-to-noise ratio) that represent a significant improvement over previous designs, especially in the presence of a large frequency offset. In addition, the phase linearity of the complementary FIR filter (i.e., the A/V separation filter 214 of FIG. 2) provides for a reduction in harmonic distortion for the audio signal.

The ability, within the receiver design proposed herein, to reconfigure the order in which frequency offset reduction (as controlled by the video carrier recovery circuit 210) and audio/video separation (at the A/V separation filter 214) are performed may be seen to further ease the demodulation of the output digitized audio signal.

Although the majority of the preceding description is specific to television signals that follow the NTSC standard, it will be appreciated by those skilled in the art, that the preceding may equally be applied to television signals that follow an alternative format such as the Phase Alternating Line (PAL) format or the Systeme Electronique Couleur Avec Memoire (SECAM) format.

Other modifications will be apparent to those skilled in the art and, therefore, the invention is defined in the claims.

We claim:

1. An apparatus for processing a near-baseband, received digitized television signal comprising:
   a video carrier recovery circuit adapted to:
      receive a video carrier recovery circuit input signal, said video carrier recovery circuit input signal including a video carrier signal;
      detect a phase offset of said video carrier signal;
      generate a phase adjustment signal based on said phase offset;
      produce a video carrier recovery circuit output signal from said video carrier recovery circuit input signal and said phase adjustment signal;
   a filter circuit to:
      receive a filter circuit input signal, said filter circuit input signal including components in a frequency range that is expected to contain a digitized audio signal;
      produce a filter circuit output signal excluding said components in said frequency range; and
   a selection circuit adapted to switch between:
      a first configuration, wherein said near-baseband, received digitized television signal is said video carrier recovery circuit input signal and said video carrier recovery circuit output signal is said filter circuit input signal; and
      a second configuration, wherein said near-baseband, received digitized television signal is said filter circuit input signal and said filter circuit output signal is said video carrier recovery circuit input signal.

2. The apparatus of claim 1 wherein said filter circuit comprises a low pass finite impulse response digital filter.

3. The apparatus of claim 1 wherein said video carrier recovery circuit is further adapted to produce an indication of a frequency offset and said apparatus further comprises a down-converter adapted to:
   receive an offset-from-baseband digitized television signal;
   receive said indication of said frequency offset from said video carrier recovery circuit; and
   based on said indication of said frequency offset, frequency shift said offset-from-baseband digitized television signal by said frequency offset.

4. The apparatus of claim 3 wherein said filter circuit input signal includes further components in a second frequency range, said second frequency range expected to contain said digitized video signal and wherein said filter circuit further comprises a second filter adapted to produce a second filter circuit output signal excluding said further components in said second frequency range.

5. The apparatus of claim 4 wherein said second filter comprises a high pass finite impulse response digital filter.

6. The apparatus of claim 5 further comprising a video signal processor adapted to process said filter circuit output signal and produce a digital composite video baseband signal according to a predetermined standard.

7. The apparatus of claim 6 wherein said predetermined standard is the National Television System Committee standard.

8. The apparatus of claim 6 wherein said digitized video signal processor is adapted to determine a position for a peak of a horizontal synchronization pulse for said digital composite video baseband signal.

9. The apparatus of claim 8 further comprising a front-end gain control circuit adapted to generate a gain control signal based on a characteristic of said digitized television signal and an indication of said position for said peak of said horizontal synchronization pulse.

10. A method of processing an analog television signal comprising:
   converting said analog television signal to a digitized television signal having a frequency offset relative to baseband;
   in a first mode of operation, reducing said frequency offset to produce a near-baseband digitized television signal having a residual frequency offset;

producing a first mode residual signal representative of said residual frequency offset of said first mode near-baseband digitized television signal;

based on said first mode residual signal, reducing said frequency offset to produce a first-mode nearer-to-baseband digitized television signal;

filtering said first mode nearer-to-baseband digitized television signal to produce a first mode first filter output signal in a frequency range, expected to contain an audio signal;

in a second mode of operation, reducing said frequency offset to produce a second mode near-baseband digitized television signal having a residual frequency offset;

filtering said second mode near-baseband digitized television signal to produce a second mode first filter output in a frequency range expected to contain an audio signal, and a second mode second filter output signal, in a frequency range expected to contain a digitized video signal;

producing a second mode residual signal representative of said residual frequency offset of said second mode near-baseband digitized television signal from said second mode second filter output signal;

based on said second mode residual signal, reducing said frequency offset to produce a second mode nearer-to-baseband digitized television signal.

11. The method of claim 10 further comprising filtering said first mode nearer-to-baseband digitized television signal to produce a first mode second filter output signal having components restricted to a frequency range, expected to contain a digitized video signal.

12. The method of claim 11 further comprising demodulating said first mode second filter output signal to produce a digital composite video baseband signal according to a predetermined standard.

13. The method of claim 12 wherein said predetermined standard is the National Television System Committee standard.

14. A television signal reception system comprising:

a tuner adapted to shift an analog television signal associated with a radio frequency carrier to an analog television signal at an intermediate frequency;

a variable gain amplifier;

an analog to digital converter adapted to produce a digitized television signal having a frequency offset relative to baseband, where said digitized television signal is based on said analog television signal at said intermediate frequency;

a separator including:

a video carrier recovery circuit adapted to detect said frequency offset and produce an indication of said frequency offset;

a mixer, responsive to receipt of said indication of said frequency offset, adapted to reduce said frequency offset to produce a near-baseband digitized television signal;

a filter adapted to filter said near-baseband digitized television signal to produce a digitized sound signal;

a second filter to filter said near-baseband digitized television signal to produce a digitized video signal;

a video processor adapted to produce a digital component video baseband signal based on said digitized video signal;

wherein said separator and said video processor are further adapted to produce a control signal for said variable gain amplifier to maintain characteristics of said analog television signal at said intermediate frequency within a range acceptable to said analog digital converter, where said control signal is based on said digital component video baseband signal.

15. The reception system of system of claim 14 wherein said control signal is based in part upon a position for a peak of a horizontal synchronization pulse in said digital component video baseband signal.

16. The reception system of claim 15 wherein said control signal is based in part upon a target metric of said digital television signal at the output of said analog to digital converter.

17. The reception system of claim 16 wherein said target metric is peak amplitude.

18. The reception system of claim 16 wherein said target metric is peak power.

19. An apparatus for processing a near-baseband, received digitized television signal comprising:

a video carrier recovery circuit including:

a video carrier recovery circuit input port to receive a video carrier recovery circuit input signal, said video carrier recovery circuit input signal including a video carrier signal;

a phase error detector to detect a phase offset of said video carrier signal;

a loop filter to generate a phase adjustment signal based on said phase offset;

a video carrier recovery circuit output port to provide a video carrier recovery circuit output signal from said video carrier recovery circuit input signal and said phase adjustment signal;

a filter circuit including:

a filter circuit input port to receive a filter circuit input signal, said filter circuit input signal including components in a frequency range that is expected to contain a digitized audio signal;

a filter to produce a filter circuit output signal by excluding said components in said frequency range; and a filter circuit output port to transmit said filter circuit output signal;

a first selection switch to receive first received signals including said near-baseband, digitized television signal and said filter circuit output signal and pass one of said first received signals to said video carrier recovery circuit input port; and a second selection switch to receive second received signals including said near-baseband, digitized television signal and said video carrier recovery circuit output signal and pass one of said second received signals to said filter circuit input port.

* * * * *